Dec. 30, 1947. J. SALZER Re. 22,956

APPARATUS FOR ROLLING RADIATOR CORE ELEMENTS

Original Filed Feb. 9, 1942 4 Sheets-Sheet 1

Inventor

John Salzer

By Clarence A. O'Brien and Harvey B. Jacobson

Attorneys

Dec. 30, 1947. J. SALZER Re. 22,956
APPARATUS FOR ROLLING RADIATOR CORE ELEMENTS
Original Filed Feb. 9, 1942 4 Sheets-Sheet 2
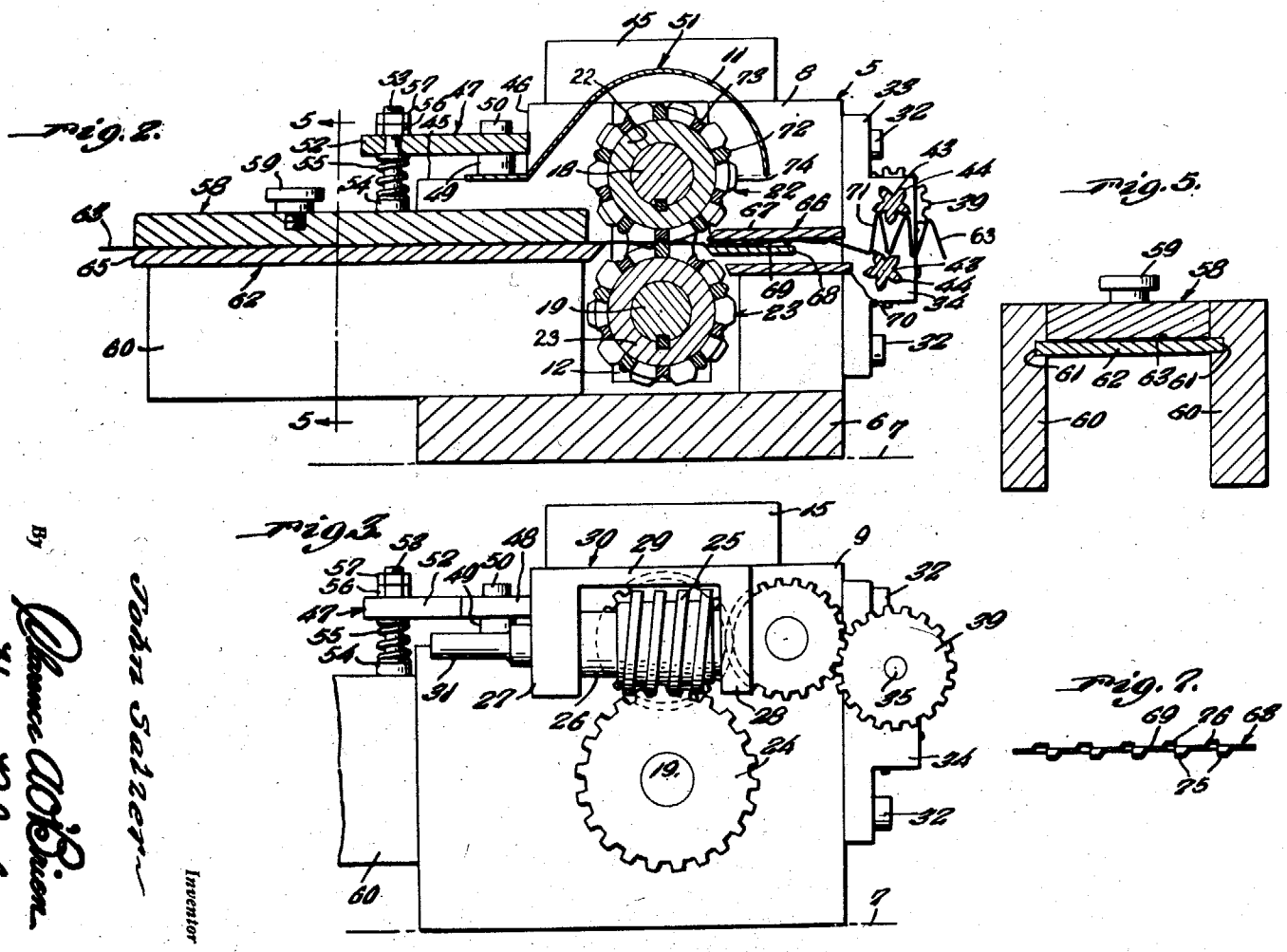
Inventor
John Salzer
By Clarence A. O'Brien and Harvey B. Jacobson
Attorneys Dec. 30, 1947. J. SALZER Re. 22,956

APPARATUS FOR ROLLING RADIATOR CORE ELEMENTS

Original Filed Feb. 9, 1942 4 Sheets-Sheet 3

Inventor

John Salzer

By Clarence A. O'Brien and Harvey B. Jacobson Attorneys

APPARATUS FOR ROLLING RADIATOR CORE ELEMENTS

Original Filed Feb. 9, 1942 4 Sheets-Sheet 4

Inventor

John Salzer

By Clarence A. O'Brien and Harvey B. Jackson Attorneys

Reissued Dec. 30, 1947

Re. 22,956

UNITED STATES PATENT OFFICE 22,956

APPARATUS FOR ROLLING RADIATOR CORE ELEMENTS

John Salzer, Houston, Tex., assignor to Palo R. Daniel, Harris County, Tex.

Original No. 2,378,661, dated June 19, 1945, Serial No. 430,122, filed February 9, 1942. Application for reissue filed September 8, 1945, Serial No. 615,240

8 Claims. (Cl. 153—77)

This invention relates to apparatus for producing formed and shaped blanks for use in the construction of the water tubes and intervening louvered fins of internal combustion engine, and other, radiators and more particularly to an apparatus and method for producing said elements in a single continuous pass from sheet metal in roll form, and the primary object of the invention is to provide a simple and efficient arrangement of the character indicated which greatly speeds up and reduces the expense of production.

Another object of the invention is to provide a novel apparatus for producing such elements in a single continuous pass from sheet metal in roll form.

It is a further object of the invention to provide novel means for folding the strip of metal to provide the required flutes which form the air passageways through the completed radiator.

A still further feature of the invention is to provide a simple and efficient arrangement of the character described by means of which the operation of folding the strip of metal will be greatly speeded up and the expense of production correspondingly reduced.

Other important objects and advantages of the invention will be apparent from a reading of the following description taken in connection with the appended drawings, wherein for purposes of illustration preferred embodiments of the invention have been shown.

Referring more particularly to the drawings:

Figure 2 is a vertical longitudinal sectional view taken through Figure 1 approximately centrally.

Figure 3 is a fragmentary side elevational view of said embodiment, looking upwardly in Figure 1.

Figure 5 is a transverse vertical sectional view taken through Figure 2 along the line 5—5.

Figure 7 is a transverse vertical sectional view taken through Figure 6.

Figure 13 is a fragmentary plan view of the radiator core element formed by the rollers shown in Figure 12.

Figures 1, 4, 6:
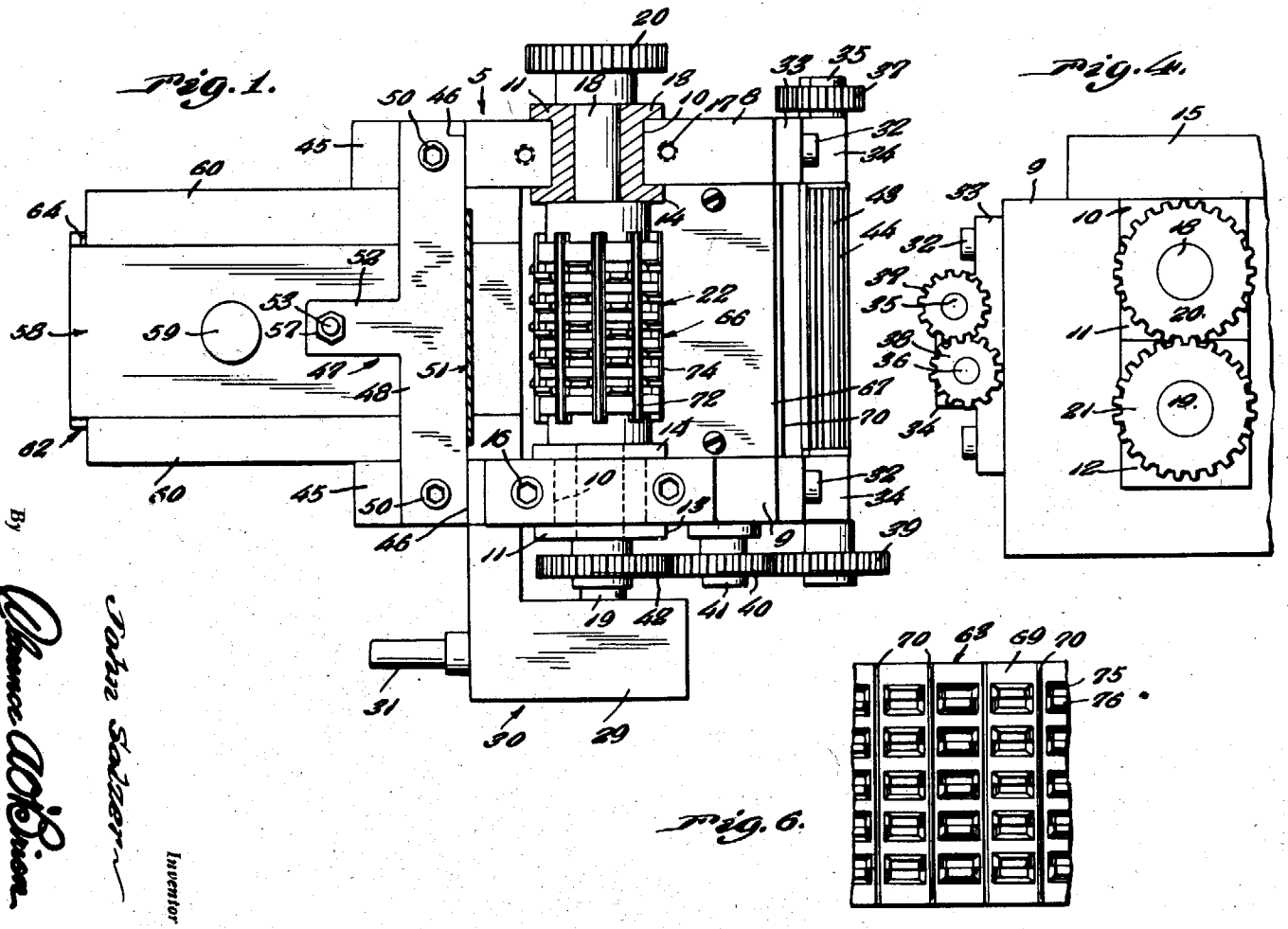
Figure 1 is a general top plan view of an embodiment of the invention for producing the V-shaped cross section type of radiator core forming element, with portions in horizontal section.
Figure 4 is a fragmentary elevational view of the opposite side of Figure 1.
Figure 6 is a fragmentary top plan view of a rolled blank produced by the mentioned embodiment.
Figure 12:
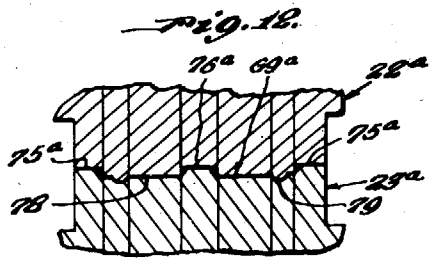
Figure 12 is a fragmentary longitudinal sectional view taken through the rollers of the apparatus shown in Figure 8, illustrating the cooperation between the upper and lower rollers in the formation of the radiator core elements.
Figure 15:
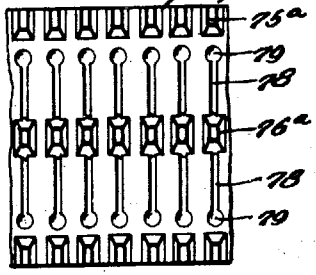
Figure 8:
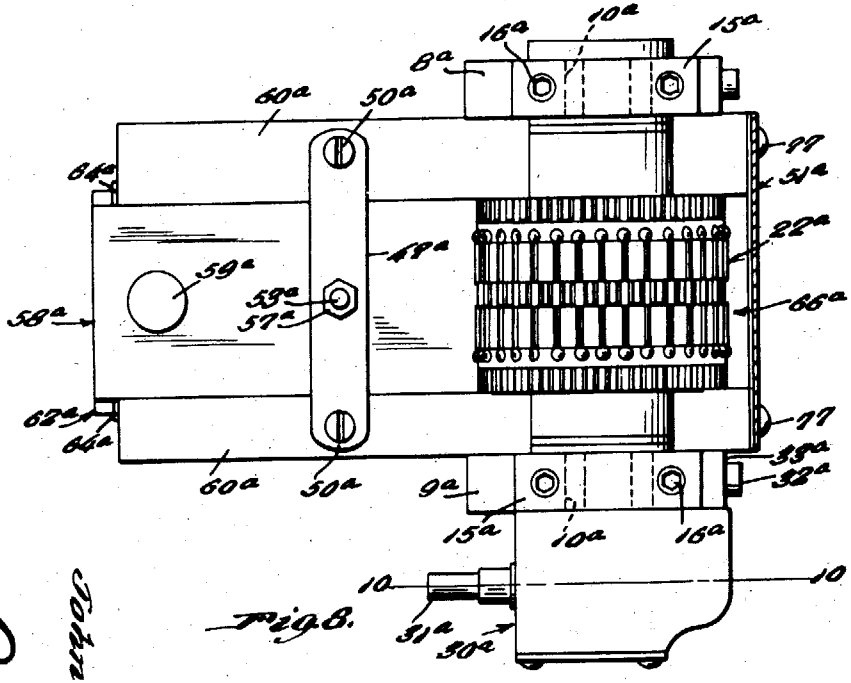
Figure 8 is a general top plan view of another embodiment of the invention.
Figures 9, 10, 11:
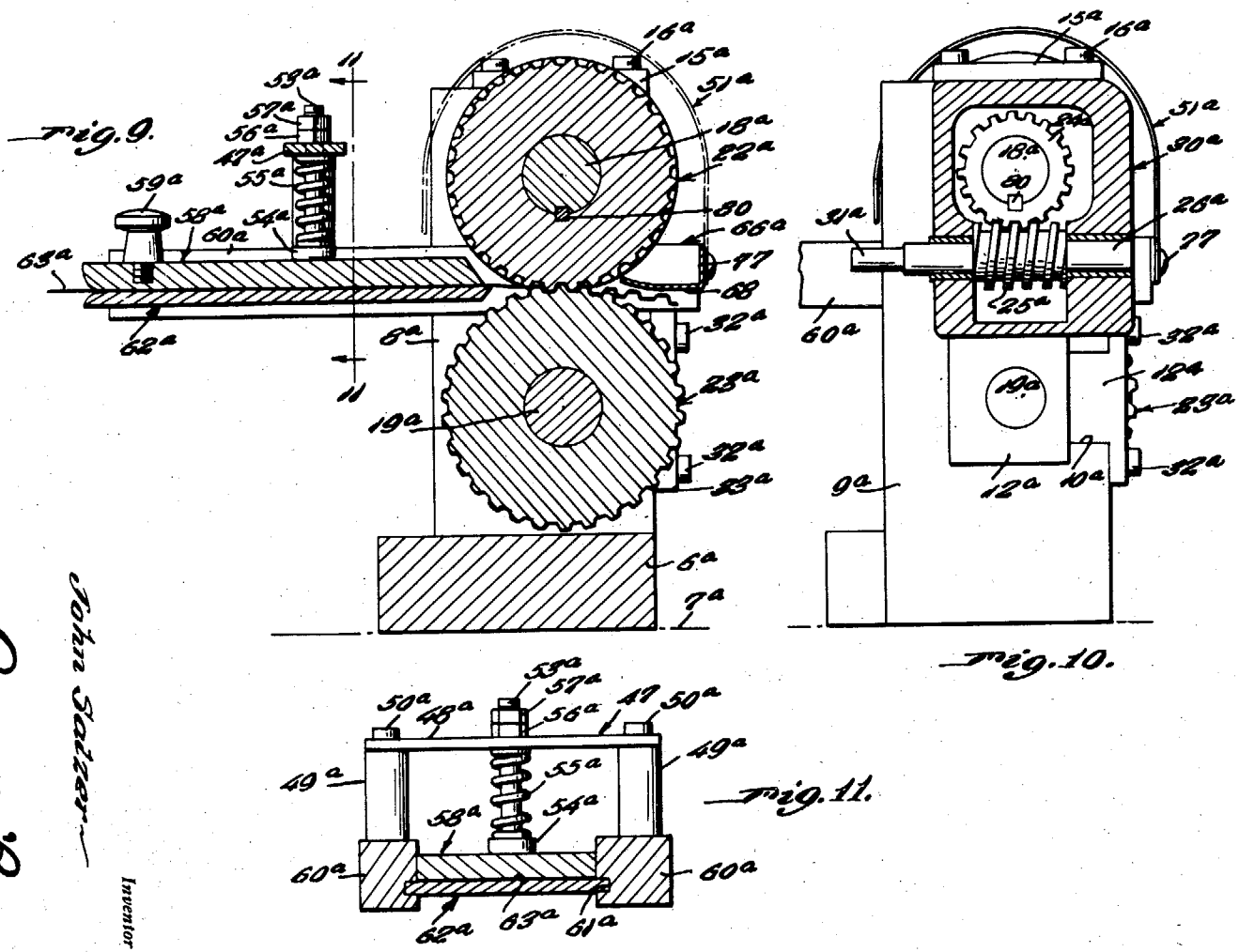
Figure 9 is a vertical longitudinal sectional view taken through the second embodiment approximately centrally.
Figure 10 is a transverse vertical sectional view taken through Figure 8 along the line 10—10.
Figure 11 is a transverse vertical sectional view taken through Figure 9 along the line 11—11 and looking in the direction of the arrows.

Referring in detail to the drawings and first to the embodiment shown in Figures 1 through 7, the numeral 5 generally designates the machine as a whole, the same comprising a flat rectangular base 6 for resting on and securing to a supporting surface 7, and rectangular walls 8 and 9 respectively, rising from the opposite longitudinal sides of the base. Intermediate their ends, the walls have vertical slots 10 opening through their upper edges which slidably receive the pairs of upper and lower removable bearing blocks 11 and 12, respectively, which have flanges 13 and 14, respectively, bearing on the outer and inner sides of the walls 8 and 9 and are secured in place by studs 16 which screw into holes 17 in the said upper edges.

The upper bearing blocks 11 journal opposite end portions of the upper shaping shaft 18, while the lower bearing blocks 12 journal opposite end portions of the lower shaping shaft 19. Outside of the wall 8 the shafts have fixed thereon the meshing gears 20 and 21 which coordinate and time the upper and lower shaping rollers 22 and 23, respectively, with relation to each other. Outside of the opposite wall 9 the lower shaft 19 has a worm wheel 24 fixed thereon which is in mesh with a worm 25 fixed on a longitudinal shaft 26 whose opposite end portions are journaled in lugs 27 and 28 depending from a horizontal longitudinal portion 29 of a bracket 30 which is secured to the outer side of the wall 9 adjacent its upper edge in the position indicated in Figures 1 and 3. The rearward end of the worm shaft 26 has a power adapter 31 enabling the machine to be driven by a suitable power element connected to the adapter.

Attached to the forward ends of the walls 8 and 9 by studs 32 are vertically elongated brackets 33 which have forwardly projecting portions 34 in which end portions of upper and lower bending and fluting shafts 35 and 36 are journaled. The left hand ends of the shafts 35 and 36 have meshing gears 37 and 38, respectively, which coordinate the operation of these shafts. The opposite end of the upper fluting shaft 35 has a larger gear 39 which is operatively meshed with an idler gear 40 mounted on a stub shaft 41 on the wall 9, a gear 42 fixed on the upper roller shaft 18 being in mesh with the idler gear 40. As a result the vertically spaced fluting shafts 35 and 36 are timed and coordinated with the rollers 22 and 23.

The surfaces of the fluting shafts are longitudinally grooved as indicated at 43 to define equally circumferentially spaced longitudinal elements 44 extending between the brackets 33. The upper fluting shaft 35 is positioned slightly forwardly with respect to the lower fluting shaft 36 as indicated in Figures 2 and 4.

The upper corners of rear ends of the walls 8 and 9 are notched to define the horizontal rest 45 and the vertical abutment 46. A yoke or bridge 47, comprising a transversely elongated bar 48 has its forward edge positioned against the said abutments and is spaced upwardly from the rests 45 by spacers 49, with studs 50 passing through the ends of the bar 48 and the spacers and threading into holes formed in the rests. The studs also pass through openings formed in a flange on a sheet metal arcuate hood 51 which spacedly overhangs the upper roller 22 as shown in Figure 2, the said flange being thereby supportably traversed by a bolt 53 which has a foot 54 on its lower end with a helical expanding spring 55 circumposed on the bolt between the said foot and the bottom of the lug 52, which lug is an extension of bar 48. A nut 56 supplemented by a lock nut 57 is threaded on the upper end of the bolt 53 to adjust the compression of the spring 55. The foot 54 bears down upon the heavy elongated pressure plate 58 which is equipped with a handle 59 by which it may be slidably removed or adjusted in position between two horizontally elongated vertical plates 60 whose forward end portions are secured against the inner sides of the side walls 8 and 9 and whose rearward end portions project rearwardly from the said side walls.

The plates 60 have facing grooves 61 formed near their upper edges and in which are secured the side edges of the horizontal material guide plate 62 upon which the sheet metal blank 63 slidably rests, with the pressure plate 58 resting thereon with the force of its own weight and the downward pressure exerted on it by the spring pressed foot 54. The rearward part of the pressure plate 58 has a lateral limit stop 64 to engage the rear end of one of the plates 60 to prevent forward over-reaching of the pressure plate beyond the forward end of the guide plate 62. The rear end of the guide plate is upwardly beveled as indicated at 65. The top of the guide plate 62 is on a level with the space between the immediately opposed portions of the upper and lower shaping rollers 22 and 23.

In front of the said rollers is the assembly 66 comprising three horizontal plates. The upper fixed plate 67 is secured to and between the side walls 8 and 9 with its bottom approximately on a level with the top of the guide plate 62. The upper plate 67 extends from a point between the shaping rollers 22 and 23 to the forward ends of the side walls 8 and 9. The intermediate fixed plate 68 is secured between the said side walls and has its upper surface spaced below the bottom of the plate 67 at a distance slightly greater than the greatest vertical dimension of the formed portion 69 of the sheet metal blank 63. The forward edge of the intermediate plate is substantially rearwardly spaced from the forward edge of the upper plate 67. The lower plate 70 is slidably removably mounted between the side walls 8 and 9 and is sufficiently spaced below the intermediate plate and the upper plate to enable the necessary partial bending of the formed portion 69 of the sheet metal blank while preventing undue downward deflection.

In view of the above arrangements and the presence at predetermined longitudinal intervals in the formed portion 69 of the metal blank of transversely extending alternately upwardly and downwardly convexed bends or flutes 71, the tendency is for the blank to bend alternately in opposite directions, that is, upwardly and downwardly as the blank reaches toward the forward end of the assembly. This tendency is given effect by the arresting action on the forward movement of the blank as it emerges from the assembly 66 which is provided by the engagement of the foremost part of the blank in a groove of one of the two relatively slowing turning bending shafts 35 and 36 and is as a result buckled or bent along the immediately following bend or flute 71. As the resulting accordion pleat 71 is fully formed it reaches toward the roller opposed to that first engaged and the apex of the fold engages in one of the grooves thereof. As the floating shafts 35 and 36 turn in opposite directions, the pleats are worked forwardly from between these rollers as indicated in Figure 2 of the drawings.

The shaping rollers 22 and 23 may have any suitable or desired contours in accordance with the depressions, elevations, and cuts wanted in the finished core elements. The flutes 71 are formed by longitudinal circumferentially spaced members comprising the male elements 72 and the mating female elements 73. Between the adjacent male and female elements, which alternate around the rollers, are the longitudinally staggered, circumferentially alternating combined forming and cutting bosses 74 which produce the concavo-convex depressions 75 and raised portions 76 in the sheet metal blank 63 with slits between them and it passes between the rollers, as shown in Figure 7. The arrangement of the bosses gears the rollers together through the interventing sheet metal, which for forming radiator core elements, is preferably copper.

Referring now to the embodiment shown in Figures 8 through 13 of the drawings, the same numerals, primed with *a*, designate the parts similar to those of the first described embodiment. In the second embodiment the walls 8*a* and 9*a* are shortened and vertically elongated, and slotted from the upper end at 10*a* to accommodate the bearing blocks 11*a* for the upper shaping shaft 18*a*, the blocks having the elongated heads bolted at 16*a* to the upper edges of the walls 8*a* and 9*a*. The lower shaping shaft 19*a* is journaled in bearing blocks 12*a* seated in horizontal slots 19*a* opening through the forward ends of the walls 8*a* and 9*a* with the heads 16*a* of the said blocks bolted at 32*a* to the forward ends of the walls. The shafts 18*a* and 19*a* are vertically aligned and have fixed thereon the upper and lower shaping rollers 22*a* and 23*a*, respectively. The rollers are geared to each other through the intervening sheet metal strip or blank 63 and have no operative connection. The upper shaft 18a is driven through a worm wheel 24a fixed on its right hand end, meshed with a worm 25a fixed on a worm shaft 26a horizontally journaled in longitudinally spaced parts of the bracket 30a, the rearward and exposed end of the shaft 26a having a power adapter 31a for connection with a suitable power drive.

The present embodiment is devoid of the assembly 66 and the fluting shafts 35 and 36 characterizing the first embodiment, and has at this location only the deflector 66a for giving a forward and downward path to the formed sheet metal blank as it emerges from between the forming rollers. The deflector comprises a horizontal plate 68a slightly turned up at its rearward edge and provided on its forward edge with a vertical flange which has end portions bolted at 77 to the forward ends of the side plates 60a, which in the present embodiment extend forwardly of the walls 8a and 9a. The bolts 77 also securably pass through an upwardly and rearwardly curved hood 51a which spacedly overlies the upper roller 22a. As in the case of the first embodiment the strip sheet copper 63 is manually fed from a roll thereof between the rearward ends of the pressure plate 58a and the guide plate 62a, or with the pressure plate 58a removed the strip is laid on the guide plate 62a and moved forwardly until between the forming rollers and the pressure plate then replaced, whereat the machine, if not already operating, is ready for operation.

The shaping rollers 22a and 23a are made up of axially adjacent disks each one of which has characteristic depressions or elevations adapted to mate with the elevations and depressions, respectively of the related disks of the other roller, as the rollers are revolved with the sheet metal therebetween, thereby gearing the rollers together and forming the metal at the same time.

The formed blank 69a is characterized by marginal open ended elevations 75a and by centralized closed end elevations 76a, with transversely elongated depressions 78 extending laterally from and communicating with the opposite ends of the centralized elevations 76a, the outer ends of the depression 78 leading into circular depressions 79 spaced from the inner ends of the marginal elevations 75a. The peripheries of the disks forming the rollers are formed appropriate to the described formations. The upper shaping roller 22a is keyed at 80 to the upper shaft 18a while the lower shaping roller 23a is not so keyed.

From the foregoing it is apparent that the embodiment shown in Figures 8 through 13 produces an unperforated or unslitted blank from which water circulating tubes may be constructed by sealing together the side margins of two said blanks, superimposed one upon the other and the embodiment shown in Figures 1 through 7 produces a slitted and folded blank for use as louvered, air circulating fins between the water circulating tubes. The transversely aligned elevations shown in Figure 13 serve as spacers to receive the corresponding apexes of the adjacent folds of the fins between them to aid in accurately fitting the fins to the water tubes in assembling said parts in the construction of radiator cores.

The drawings and description disclose what are now considered to be preferred forms of the invention by way of illustration only while the broad principle of the invention will be defined by the appended claims.

What I claim is:

1. Apparatus for producing in a single continuous pass a metal strip characterized by regular lateral displacements, said apparatus comprising an entrance structure for receiving a blank metal strip, upper and lower shaping rollers arranged to engage the opposite sides of the strip, means on the rollers which co-act to transversely crease the strip on opposite sides and at regular intervals apart, a guideway through which the creased strip passes from said rollers, and rotatable fluting members mounted in spaced relation to each other, said fluting members being formed with circumferentially spaced projections, means for rotating said members, said fluting member being so coordinated with said rollers so as to retard the forward motion of the strip and the arrangement and spacing of said members being such that the projections engage with the strip and alternatively bend the strip at the creases in opposite directions.

2. Apparatus for fluting a metal strip comprising upper and lower co-operating feed rollers arranged to engage the opposite sides of the strip, means for driving said rollers to advance the strip, said rollers having raised portions and depressions arranged to form the strip with reinforced portions separated by unformed portions extending laterally of the strip, means for guiding the metal strip as it passes between said rollers, rotatable fluting shafts mounted for rotation in spaced relationship, said shafts being formed with circumferentially spaced projections, means for rotating said shafts at a lower peripheral speed than said rollers, and said fluting shafts being arranged so that the projections engage with the strip and alternatively bend the strip at the unformed portions in opposite directions.

3. Apparatus for forming a strip of sheet material, a pair of co-operating rollers arranged to engage the opposite sides of the strip, means for driving said rollers to advance the strip, said rollers having raised portions and depressions arranged to form the strip with reinforced portions separated by unformed portions extending laterally of the strip, guide means through which the strip may be fed between the rollers, fluting shafts spaced forwardly of said rollers and also spaced apart for rotation in spaced relationship and having folding means thereon provided with substantially longitudinal grooves, strip positioning means between the rollers and fluting shafts, the fluting shafts being so constructed and so coordinated with the rollers as to retard the strip as it emerges from between said rollers causing it to bend in the unformed portions, said positioning means comprising vertically spaced horizontal surfaces permitting limited downward deflection of the strip by reason of engagement of portions of the strip with said grooves, said fluting shafts operating in opposite directions with respect to each other and with respect to the rollers to produce alternate folding of the strip in upward and downward directions.

4. Apparatus for producing in a single continuous pass a folded metal strip, said apparatus comprising an entrance structure for receiving the blank metal strip, upper and lower rollers adjacent said structure and arranged to engage the opposite sides of the strip, means for driving said rollers to advance the strip, said rollers having raised portions and depressions arranged to form the strip with reinforced portions separated by unformed portions extending laterally of the strip, a guideway to receive the strip as it leaves the rollers to confine the strip against lateral and vertical movement, and rotatable members mounted in spaced relation to each other and in advance of said rollers, said members being formed with circumferentially spaced projections, means for rotating said members at a lower peripheral speed than said rollers, the arrangement and spacing of said members being such that the projections engage with the strip and alternatively bend the strip at the unformed portions in opposite directions.

5. Apparatus for producing in a single continuous pass a folded metal strip, said apparatus comprising an entrance structure for receiving the blank metal strip, upper and lower rollers adjacent said structure and arranged to engage the opposite sides of the strip, means for driving said rollers to advance the strip, said rollers having raised portions and depressions arranged to form the strip with reinforced portions separated by unformed portions extending laterally of the strip, a guideway to receive the strip as it leaves the rollers to confine the strip against lateral and vertical movement, and rotatable members mounted in spaced relation to each other with their axes slightly offset horizontally and in advance of said rollers, said members being formed with circumferentially spaced projections, means for rotating said members at a lower peripheral speed than said rollers, the arrangement and spacing of said members being such that the projections engage with the strip and alternatively bend the strip at the unformed portions in opposite directions.

6. Apparatus for producing in a single continuous pass a folded metal strip, said apparatus comprising an entrance structure for receiving the blank metal strip, upper and lower rollers adjacent said entrance structure and arranged to engage the opposite sides of the strip, means for driving the rollers to advance the strip, said rollers having raised portions and depressions arranged to form the strip with reinforced portions separated by unformed portions extending laterally of the strip, said entrance structure terminating at a point between the rollers for guiding said strip between the rollers, a pressure regulated plate to slidably rest on the strip within said entrance, downwardly acting spring means pressing said plate upon the strip, and rotatable fluting shafts mounted in spaced apart relationship to each other, circumferentially spaced longitudinal grooves formed on said shafts, means coordinating said shaping rollers and said fluting shafts, and formed strip positioning means located between said shaping rollers and said fluting shafts for handling the formed strip as it emerges from between said shaping rollers, said positioning means comprising vertically spaced horizontal surfaces, permitting limited downward deflection of the metal strip with respect to the plane of its emergence by reason of the engagement of portions of the strip with the grooves of said fluting shafts, means for rotating said shafts at a lower peripheral speed than said rollers, the arrangement and spacing of said shafts being such that the grooves therein engage with the strip and alternatively bend the strip at the unformed portions in opposite directions.

7. Apparatus for producing in a single continuous pass a folded metal strip characterized by regular lateral displacements, said apparatus comprising an entrance structure for receiving a blank metal strip, upper and lower shaping rollers between which the metal strip is advanced and arranged to engage the opposite sides of the strip, means for driving said rollers to advance the strip, said rollers having raised portions and depressions arranged to form the strip with reinforced portions separated by unformed portions extending laterally of the strip, opposed rotatable fluting shafts mounted for rotation in spaced apart relationship, said fluting shafts being formed with circumferentially spaced projections, means for rotating said fluting shafts at a lower peripheral speed than said shaping rollers, the arrangement and spacing of said shafts being such that the projections engage with the strip and alternatively bend the strip at the unformed portions in opposite directions.

8. The invention described in claim 7 wherein the fluting shafts rotate in opposite directions and are so constructed and arranged that after the first fold or flute is formed in the front end of the advancing metal strip the apexes of the succeeding folds come into contact with the projections of one shaft and then with the projections of the other shaft.

JOHN SALZER.

REFERENCES CITED

The following references are of record in the file of this patent:

UNITED STATES PATENTS

| Number | Name | Date |
|---|---|---|
| 767,883 | Grafton | Aug. 16, 1904 |
| 1,009,365 | Wirt | Nov. 21, 1911 |
| 1,240,212 | Horvath | Sept. 18, 1917 |
| 1,246,145 | Nelson | Nov. 13, 1917 |
| 1,732,450 | Vance | Oct. 22, 1929 |
| 1,936,228 | Crafton | Nov. 21, 1933 |
| 1,937,466 | Smith et al. | Nov. 28, 1933 |
| 2,141,235 | Angeletti | Dec. 27, 1938 |
| 2,259,458 | Davis | Oct. 21, 1941 |

FOREIGN PATENTS

| Number | Country | Date |
|---|---|---|
| 391,342 | Great Britain | Apr. 27, 1933 |